US009315285B2

(12) United States Patent
Cordioli

(10) Patent No.: US 9,315,285 B2
(45) Date of Patent: Apr. 19, 2016

(54) TROLLEY FOR SUPPORTING A LABELLING STATION IN A LABELLING MACHINE

(75) Inventor: Andrea Cordioli, Roverbella (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 113 days.

(21) Appl. No.: 14/232,151

(22) PCT Filed: Nov. 4, 2011

(86) PCT No.: PCT/EP2011/069446
§ 371 (c)(1),
(2), (4) Date: Jan. 10, 2014

(87) PCT Pub. No.: WO2013/007317
PCT Pub. Date: Jan. 17, 2013

(65) Prior Publication Data
US 2014/0124646 A1    May 8, 2014

(30) Foreign Application Priority Data
Jul. 13, 2011    (IT) ............................... VR2011A0146

(51) Int. Cl.
*F16M 13/00*    (2006.01)
*B65C 9/00*    (2006.01)
*F16M 11/20*    (2006.01)

(52) U.S. Cl.
CPC ................. *B65C 9/00* (2013.01); *B65C 9/0062* (2013.01); *F16M 11/20* (2013.01)

(58) Field of Classification Search
CPC .......... B60C 9/00; B60C 9/06; B65C 9/0062; F16M 11/20
See application file for complete search history.

(56) References Cited

U.S. PATENT DOCUMENTS 5,256,238 A * 10/1993 Gerber .................... A41H 43/02
112/131

FOREIGN PATENT DOCUMENTS

| DE | 20310030 U1 | 4/2004 |
| EP | 2133275 AI | 12/2009 |
| WO | WO 2011/027372 A1 | 3/2011 |

OTHER PUBLICATIONS

Notification of Transmittal (PCT/ISA/220) of the International Search Report (PCT/ISA/210) and the Written Opinion of the International Searching Authority (PCT/ISA/237) for PCT/EP2011/069446 dated Mar. 20, 2012.

* cited by examiner

*Primary Examiner* — Amy Sterling
(74) *Attorney, Agent, or Firm* — Koppel, Patrick, Hebyl & Philpott

(57) ABSTRACT

A trolley for supporting a labelling station in a labelling machine, provided with front and rear wheels for resting on the floor, comprising a longitudinal rod which is provided, at the rear end, with elements adapted to cause its rotation about its own axis and with a threaded portion with a conical tip at its front end; the rod is associated with a bush which is pivoted to the trolley with a horizontal axis and able to at least rotate with respect to it. The threaded portion is adapted to mate with a portion of female thread provided with a conical guiding portion in an accommodation bush which is fixed to a surface that protrudes from the body of the labelling machine; the surface comprises at least one ramp which is adapted to be crossed by a respective wheel provided at the front end of the trolley, and means for abutment against centering means provided on the trolley.

4 Claims, 6 Drawing Sheets

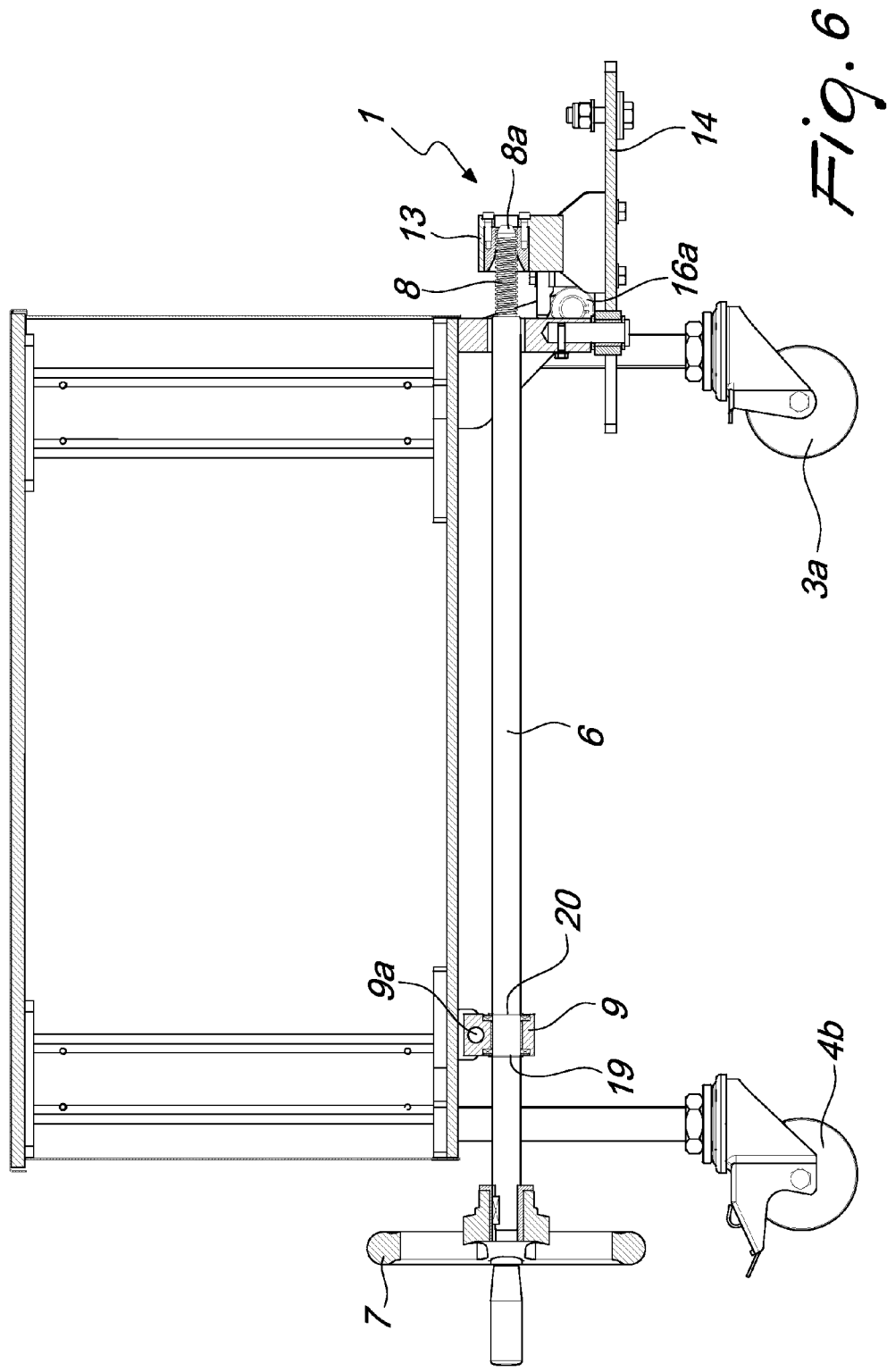

TROLLEY FOR SUPPORTING A LABELLING STATION IN A LABELLING MACHINE

TECHNICAL FIELD

The invention relates to a trolley for supporting a labelling station in a labelling machine.

BACKGROUND ART

It is known that carousel labelling machines exist in which the labelling station is supported by a trolley provided with wheels that is brought near the body of the machine in order to be fixed to the body. In this way it is possible to provide a single machine with different labelling stations, such as for example stations provided with pre-glued labels, or with gluing devices using hot or cold glue, thus achieving considerable cost saving.

It is the system of fixing the trolley to the body of the labelling machine that exhibits a number of problems in the known art.

In fact simplified machines exist in which the trolley is fixed while keeping the wheels in contact with the floor, thus reflecting the imperfections in the floor which can impair the precision required from the operation.

In complex machines the fixing occurs after lifting all of the trolley by way of an adapted device, but in this case the cost is rather high.

DISCLOSURE OF THE INVENTION

The aim of the present invention is to provide a trolley that lends itself to being fixed to the body of the labelling machine with the utmost precision using means of great simplicity.

The set aim is achieved by a trolley for supporting a labelling station in a labelling machine, according to the invention, characterized in that it comprises the characteristics according to the following claims.

BRIEF DESCRIPTION OF THE DRAWINGS

Further characteristics and advantages of the invention will become more apparent from the description of two preferred, but not exclusive, embodiments of the invention, illustrated by way of non-limiting example in the accompanying drawings wherein:

FIG. 6 is a view of a variation of the invention.

WAYS OF CARRYING OUT THE INVENTION

Figure 1:
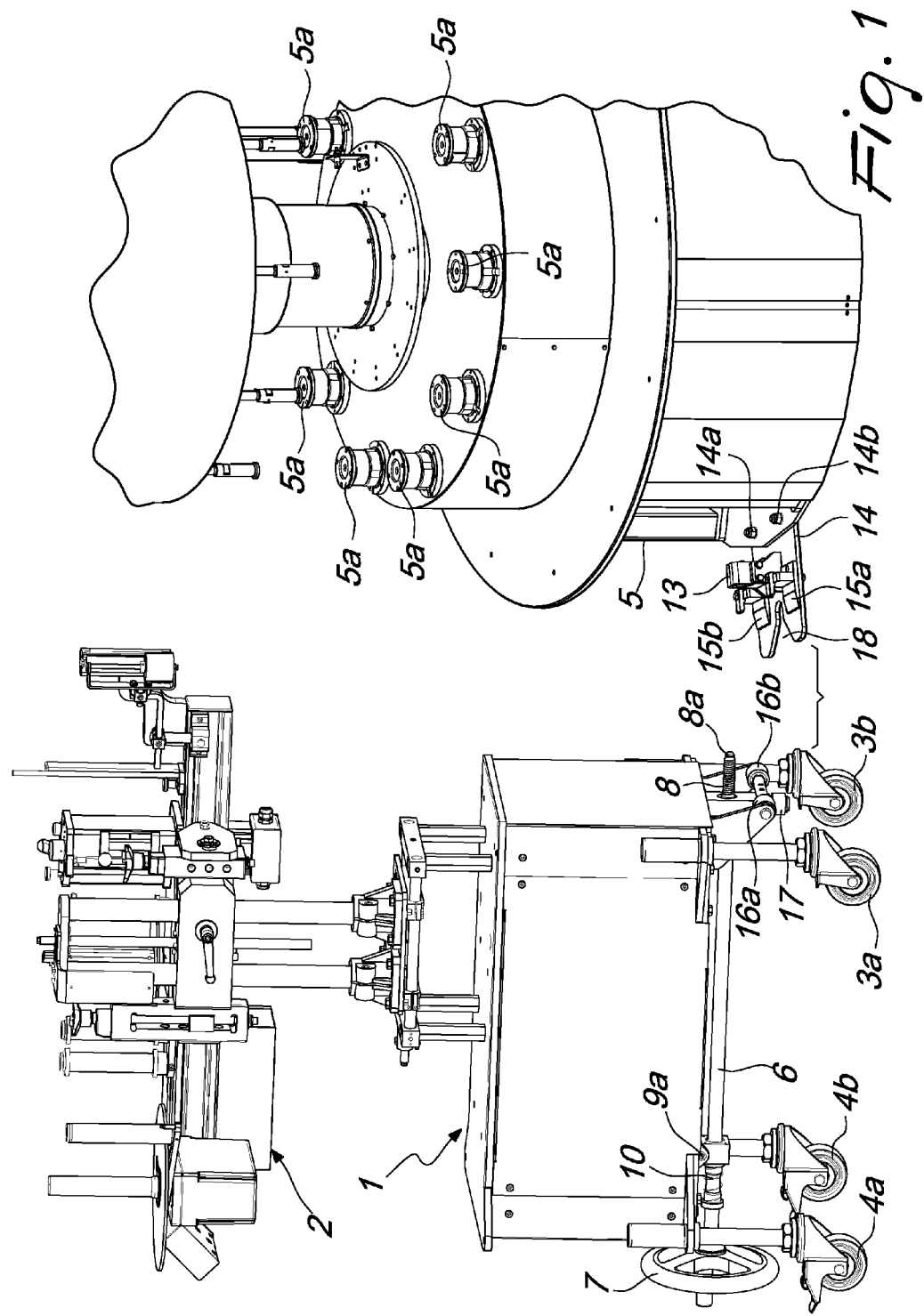
FIG. 1 is a general view of the trolley and of the labelling machine.
Figure 2:
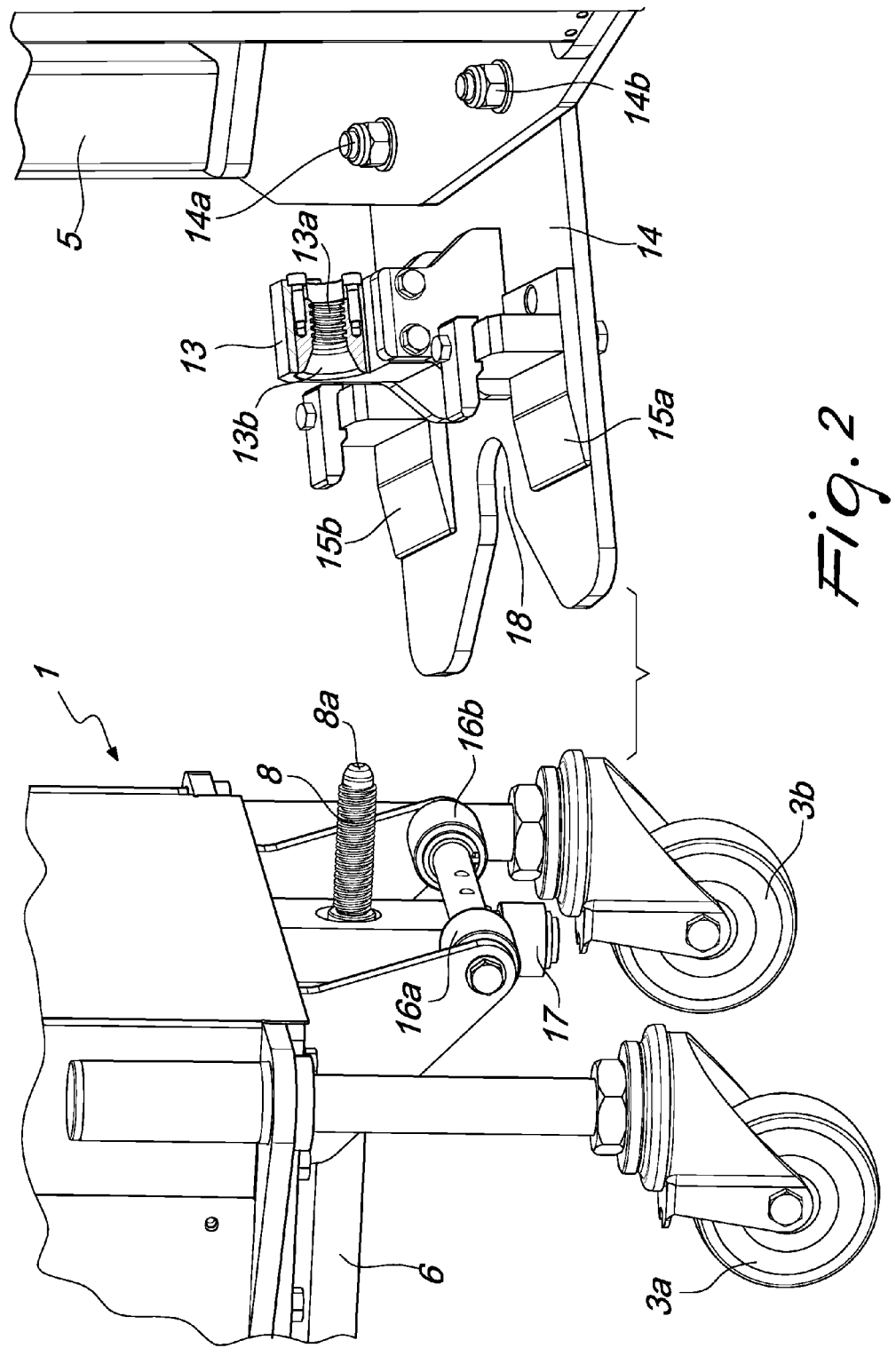
FIG. 2 is a view of a detail of FIG. 1.

With reference to FIGS. 1 to 5, the reference numeral 1 generally designates a trolley for supporting a labelling station 2, which is known per se, and which in the example illustrated is designed for use with pre-glued labels.

The trolley 1 is, for example, provided with four wheels, and specifically with front wheels 3a, 3b and rear wheels 4a, 4b, which make it possible to bring it, for subsequent fixing according to methods that will be explained, near to a body 5 of a carousel labelling machine, of which pans 5a for supporting the individual containers to be labelled are shown.

The trolley 1 comprises a longitudinal rod 6 that is provided, at the rear end, with means adapted to cause its rotation about its own axis, which are, for example, constituted by a handwheel 7, and is provided with a threaded portion 8 with a conical tip 8a at the front end.

The rod 6 is associated with a bush 9, which is pivoted, with a horizontal axis 9a, to the structure of the trolley, being able to rotate and move translationally with respect to it. Moreover, a spring 10 is provided, which is coaxial with the rod 6, and has a front end in abutment against a free bushing 10a in contact with the bush 9, and a rear end in abutment against a second free bushing 10b in contact with means which are integral with the rod 6 at the face that is directed toward the handwheel 7, constituted, for example, by a Seeger ring 11, associated with the rod 6. A second Seeger ring is designated by 12.

The threaded portion 8 of the rod 6 is adapted to mate with the female thread portion 13a, provided with a conical guiding portion 13b in an accommodation bush 13, which is fixed to a surface 14 that protrudes from the body 5 of the labelling machine, and is locked thereto, for example, by means of bolts 14a, 14b.

The surface 14 also comprises at least one ramp and, more preferably, two ramps 15a, 15b, which are arranged symmetrically with respect to the bush 13, and are adapted to make contact, as will be described in more detail in the description of the operation, with respective wheels 16a, 16b, which are provided at the front end of the trolley 1.

Centering means are also provided to ensure the correct positioning of the trolley, and comprise, for example, a roller 17, which is present on the trolley and is adapted to enter a contoured recess 18, which is defined in the surface 14 and constitutes, advantageously, abutment means for the centering means.

Figure 3:
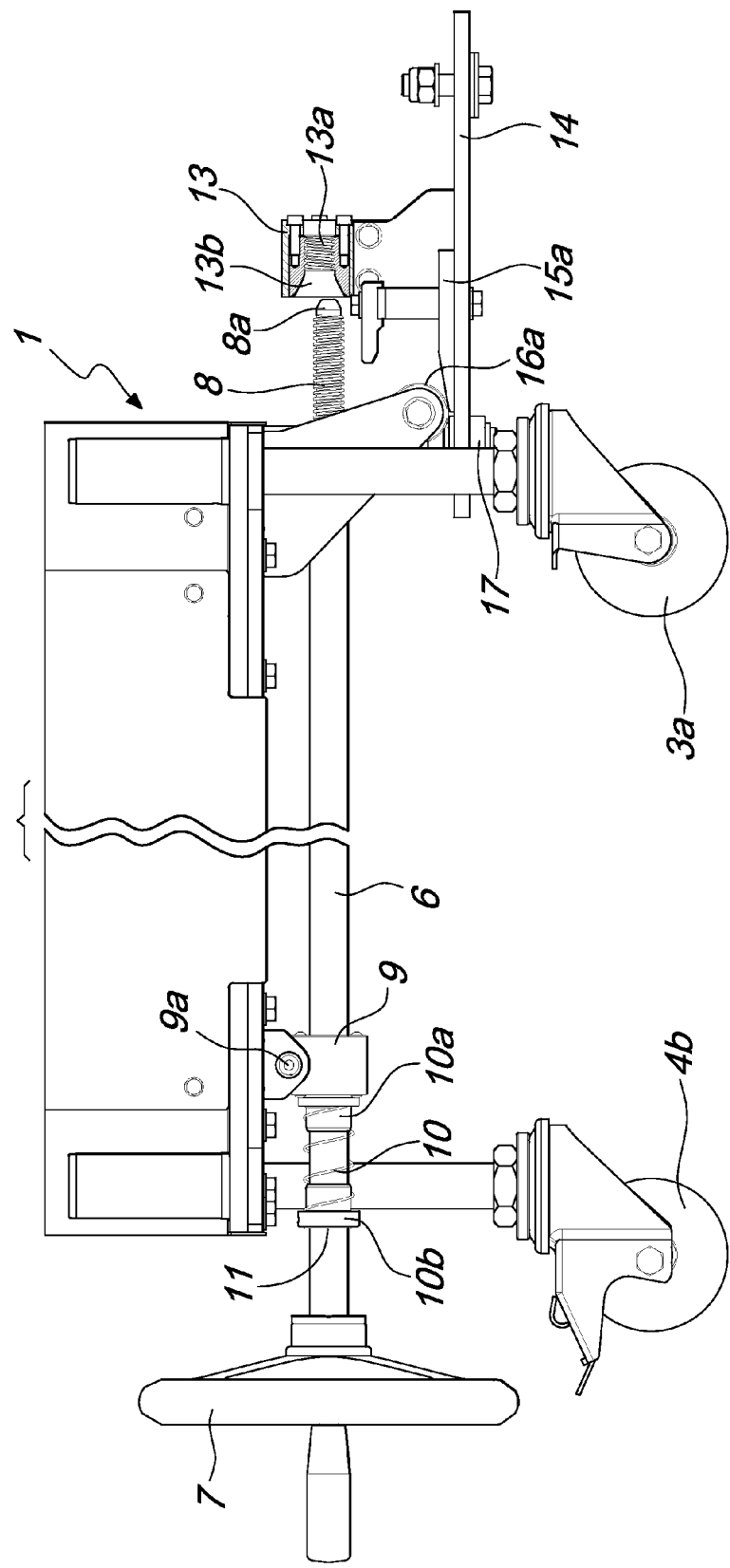
FIGS. 3, 4, 5 are views of three successive moments in the operation.

The description of the operation begins by considering the situation shown in FIG. 3 in which the trolley is stationary with the wheels 16a, 16b directly facing the ramps 15a, 15b. In this situation, which is established after the trolley is brought near the labeling machine, perhaps by an operator who is not paying particular attention, the spring 10 keeps the rod 6 in the retracted position shown in FIG. 3, thus preventing the possibility of an abrupt contact of the tip 8a thereof with the first threading of the female thread portion 13a which could have a negative effect on the integrity of the elements.

In the situation in FIG. 3, with the trolley 1 stationary, the operator turns the handwheel 7, with consequent advancement of the rod 6, thus causing the sliding of the tip 8a onto the guiding portion 13b, with rotation of the rod 6 until it is brought into axial alignment with the female thread portion 13a, up until contact is made between the tip and the first threading of the female thread portion 13a, and then the operator turns the handwheel 7, thus causing the further advancement of the rod 6 so that a small number of threadings of the portion 8, for example three threadings, engage with the same number of threadings of the female thread portion 13a.

Figure 4:
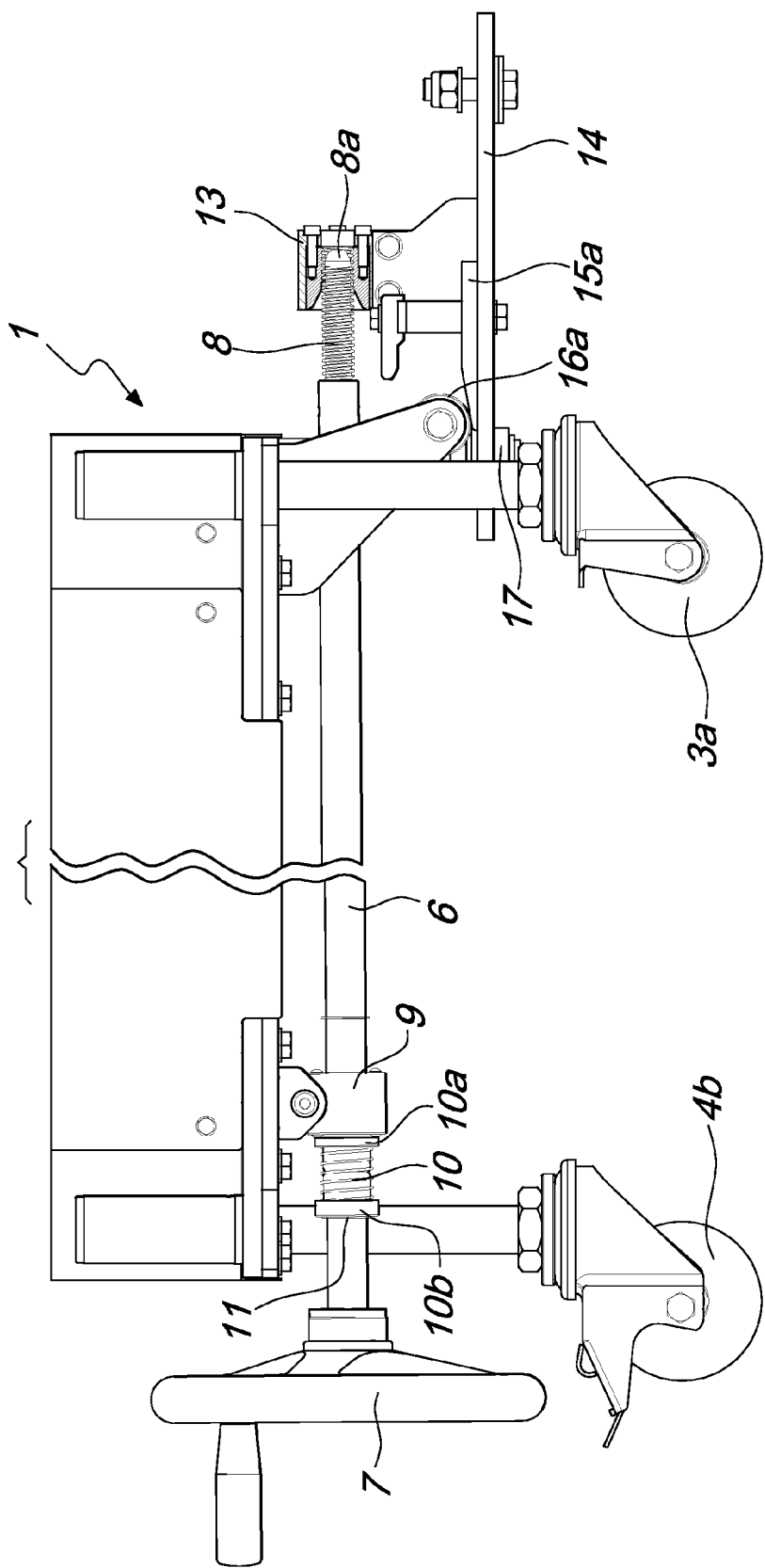

Therefore, the situation illustrated in FIG. 4 is reached practically without effort because, with the trolley remaining immobile, the spring 10, together with the events described above, is compressed until mutual contact between the bushes 10a, 10b takes place.

Figure 5:
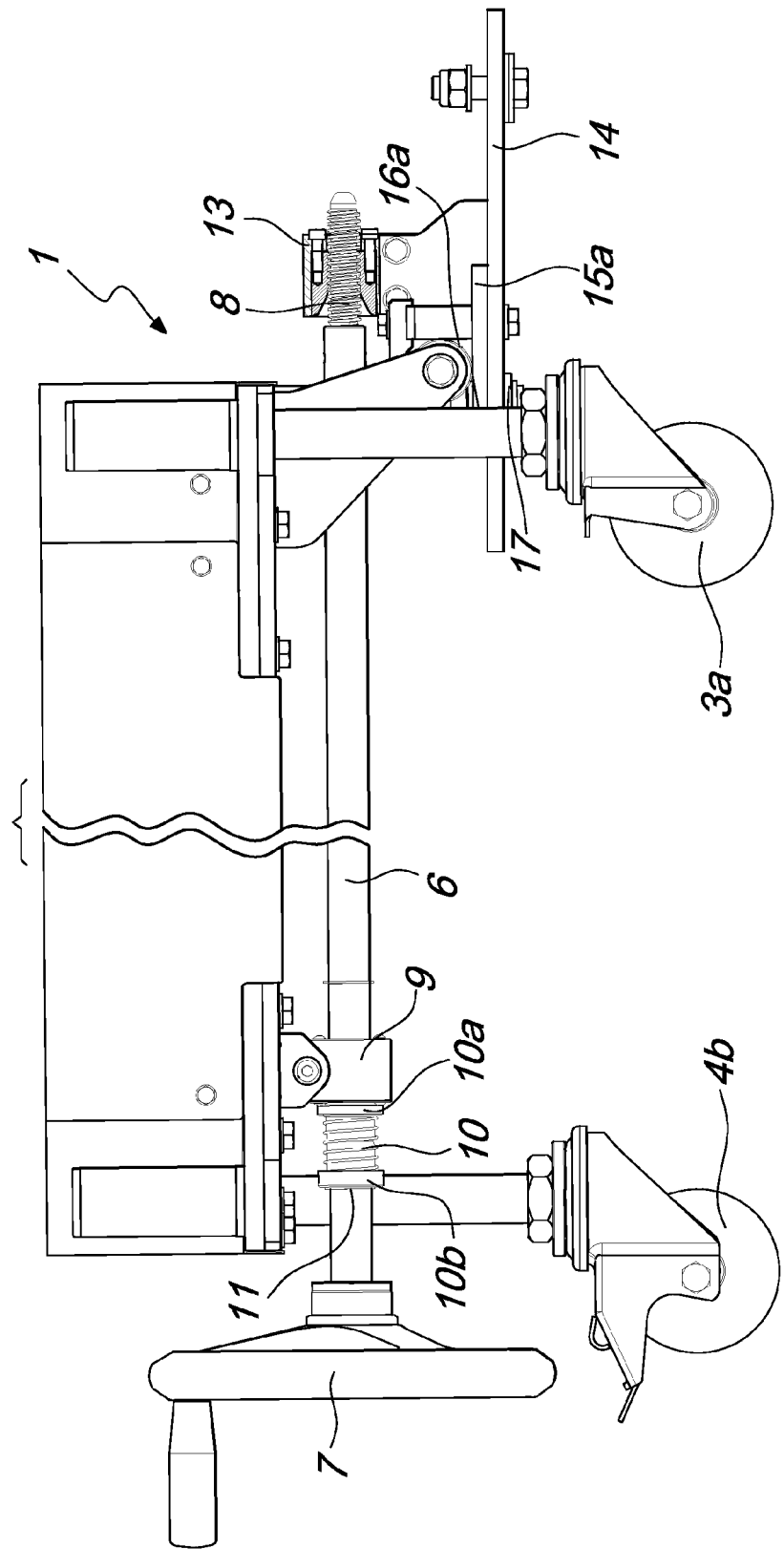

From the situation in FIG. 4 the operator proceeds with the rotation of the handwheel 7 with progressive screwing of the portion 8 of the rod 6 into the female thread portion 13a, and the trolley 1 advances by ascending, with the wheels 16a, 16b, the ramps 15a, 15b, thus causing the front wheels 3a, 3b to be lifted off the floor, and is thus arranged in the optimal conditions for locking that occurs with the required precision in the situation in FIG. 5.

Substantially reversed manoeuvres are used to push the trolley away.

FIG. 6 shows a second embodiment of the invention in which the only variation is constituted by the presence of abutments which are integral with the rod 6, and for example are constituted by two Seeger rings 19, 20 engaged on the rod 6 on opposite sides of the bush 9 pivoted at 9*a* to the structure of the trolley, which allow only the rotary motion of the rod 6 with respect to the bush with obvious consequences for the operation of the invention.

All the characteristics of the invention, indicated above as advantageous, advisable or similar, may also be missing or be substituted by equivalent characteristics. The individual characteristics set out with reference to general teachings or to specific embodiments may all be present in other embodiments or may substitute characteristics in such embodiments.

The invention described is susceptible of numerous other modifications and variations, all of which are within the scope of the appended claims. Moreover, all the details may be substituted with other, technically equivalent elements.

The disclosures in Italian Patent Application No. VR2011A000146 from which this application claims priority are incorporated herein by reference.

The invention claimed is:

1. A trolley for supporting a labelling station in a labelling machine, provided with front and rear wheels for resting on the floor, comprising a longitudinal rod which is provided, at a rear end thereof, with means adapted to cause its rotation about its own axis and with a threaded portion with a conical tip at the front end, associated with a bush which is pivoted to the trolley with a horizontal axis and able to at least rotate with respect to it, said threaded portion being adapted to mate with a portion of female thread provided with a conical guiding portion in an accommodation bush which is fixed to a surface that protrudes from the body of the labelling machine, said surface comprising at least one ramp, which is adapted to be crossed by a respective wheel provided at the front end of the trolley, and means for abutment against centering means provided on the trolley.

2. The trolley according to claim 1, further comprising a spring which is coaxial with the rod and has a front end in abutment against a first free bushing in contact with the bush that is pivoted on the trolley, and a rear end in abutment against a second free bushing in contact with means which are integral with the rod at the face that is directed toward said end, thus allowing both the rotation and the translational motion of the rod with respect to the bush that is pivoted to the structure of the trolley.

3. The trolley according to claim 1, further comprising two abutments which are integral with the rod and on opposite sides contact the bush that is pivoted on the trolley, such as to allow only the rotary motion of the rod with respect to said bush.

4. The trolley according to claim 1, wherein the surface that protrudes from the body of the labelling machine comprises two ramps, which are arranged symmetrically with respect to the accommodation bush with female thread portion and are adapted to make contact with respective wheels that are present at a front end of the trolley, said surface being provided with a recess which is adapted to receive a roller with a vertical axis that is present on the trolley to ensure a centered arrangement of said trolley with respect to said surface.

\* \* \* \* \*